US010656290B2

(12) United States Patent
Wieczorek et al.

(10) Patent No.: US 10,656,290 B2
(45) Date of Patent: May 19, 2020

(54) DIRECT PHOTON CONVERSION DETECTOR

(71) Applicant: KONINKLIJKE PHILIPS N.V., Eindhoven (NL)

(72) Inventors: Herfried Karl Wieczorek, Aachen (DE); Cornelis Reinder Ronda, Aachen (DE); Roger Steadman, Aachen (DE); Matthias Simon, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/300,079

(22) PCT Filed: May 27, 2017

(86) PCT No.: PCT/EP2017/062810
§ 371 (c)(1),
(2) Date: Nov. 9, 2018

(87) PCT Pub. No.: WO2017/211603
PCT Pub. Date: Dec. 14, 2017

(65) Prior Publication Data
US 2019/0154851 A1 May 23, 2019

(30) Foreign Application Priority Data
Jun. 7, 2016 (EP) .................... 16173362

(51) Int. Cl.
*G01T 1/24* (2006.01)
*G01T 1/20* (2006.01)
(Continued)

(52) U.S. Cl.
CPC ............ *G01T 1/242* (2013.01); *G01T 1/1641* (2013.01); *G01T 1/2023* (2013.01); *G01T 1/243* (2013.01); *G01T 1/249* (2013.01)

(58) Field of Classification Search
CPC .......... G01T 1/164; G01T 1/00; G01T 1/003; G01T 1/17; G01T 1/20; G01T 1/24;
(Continued)

(56) References Cited

U.S. PATENT DOCUMENTS

2004/0251419 A1 12/2004 Nelson
2006/0202125 A1 9/2006 Suhami
(Continued)

FOREIGN PATENT DOCUMENTS

CN 105470391 6/2016
EP 1628142 2/2006
(Continued)

OTHER PUBLICATIONS

Sum, et al., "Advancements in perovskite solar cells: photophysics", Energy Environ. Sci., vol. 7, 2014.
(Continued)

*Primary Examiner* — Don K Wong
(74) *Attorney, Agent, or Firm* — Larry Liberchuk

(57) ABSTRACT

In the present invention a direct X-ray conversion layer comprises a material having a perovskite crystal structure. This is preferable since this enables constructing an X-ray detector with edge-on illuminated detector elements.

16 Claims, 4 Drawing Sheets

(51) Int. Cl.
*G01T 1/202* (2006.01)
*G01T 1/164* (2006.01)

(58) Field of Classification Search
CPC ......... G01T 1/249; G01T 1/202; G01T 1/241; G01T 1/2018
See application file for complete search history.

(56) References Cited

U.S. PATENT DOCUMENTS

| | | | |
|---|---|---|---|
| 2009/0121142 A1 | 5/2009 | Heismann | |
| 2009/0179155 A1 | 7/2009 | Weinberg | |
| 2010/0252744 A1 | 10/2010 | Herrmann | |
| 2011/0291020 A1 | 12/2011 | Iwanczyk | |
| 2015/0268361 A1* | 9/2015 | Atsuta | G01T 1/2018 250/361 R |

FOREIGN PATENT DOCUMENTS

| | | |
|---|---|---|
| GB | 2207501 | 2/1989 |
| WO | 2006/107727 | 10/2006 |
| WO | 201315454 | 1/2013 |

OTHER PUBLICATIONS

Cheng, et al., "Layered organic-inorganic hybrid perovskites: structure, optical properties, film preparation, patterning and templating engineering", Cryst. Eng. Comm., vol. 12, 2010.

Mitzi, et al., "Preparation and Properties of (C4H9NH3)2EuI4: A Luminescent Organic-Inorganic Perovskite with a Divalent Rare-Earth Metal Halide Framework", Chem. Mater., 1997, 9 (12), pp. 2990-2995.

Lecoq, et al., "Development of new scintillators for medical applications", Nuclear Instruments and Methods in Physics Research A 809 (2016) 130-139.

Llosa, et al., "Radiation Physics for Nuclear Medicine"—Chapter 10 New Trends in Detectors for Medical Imaging, 2011.

* cited by examiner

DIRECT PHOTON CONVERSION DETECTOR

CROSS REFERENCE TO RELATED APPLICATIONS

This application is the U.S. National Phase application under 35 U.S.C. § 371 of International Application No. PCT/EP2017/062810, filed May 27, 2017 published as WO 2017/211603 on Dec. 14, 2017, which claims the benefit of European Patent Application Number 16173362.1 filed Jun. 7, 2016. These applications are hereby incorporated by reference herein.

FIELD OF THE INVENTION

The present invention generally relates to an X-ray detector element, an X-ray detector, an X-ray imaging device, a nuclear medicine imaging device, a method to produce an X-ray detection element and a method to produce an X-ray detector.

BACKGROUND OF THE INVENTION

In spectral photon-counting computed tomography (CT) small pixels of a dedicated spectral detector are used for determining energy of localized photon-to-electron conversions in a so-called direct conversion layer. State-of-the-art direct conversion layers in spectral detectors are usually based on cadmium zinc telluride (CZT) or cadmium telluride (CdTe) technologies and are typically greater than 1.5 mm thick for high photo-peak absorption and system sensitivity. Irradiation rates in a direct beam area are of an order of up to 10^9 x-ray photons per square millimeter and second. Pixels should therefore be well below square millimeter size to allow single photon counting with readout times in the range of tens of nanoseconds. State-of-the-art CZT technology, using horizontal slabs of CZT with pixelated top or bottom contacts, allows for a typical minimum pixel size of 0.2-0.5 millimeters for a 2 millimeter detector thickness. This is not sufficient for high irradiation rates since state-of-the-art photon counting electronics cannot support the rate/channel equivalent in air. An alternative solution is to illuminate the CZT edge on. However, this requires very thin slabs of CZT, typically below 1 millimeter, which is very difficult to handle and manufacture in homogenous high quality that is required, making it a costly process. On top of that CZT itself is an expensive material.

SUMMARY OF THE INVENTION

The present invention addresses the above mentioned issues to provide a less expensive alternative solution that enables single photon counting with high count rates. Embodiments according to the present invention are directed to an X-ray detector element comprising a layered structure. The layered structure comprises a direct conversion X-ray detection layer that, is connected on a first side to an electrical contact structure and on a second side, opposite to the first side, to a read-out layer comprising electrically conductive read-out structures. The X-ray detection layer comprises a material having a perovskite crystal structure. Perovskite direct conversion layers are cheaper and easier to manufacture in thin layers than state-of-the-art direct conversion materials.

Preferably the material having a perovskite structure is $AMX_3$, wherein A is a first cation, preferably an organic cation such as $C_mH_{2m+1}R$, wherein R may be any random group, preferably a nitrogen-based group; M is a second cation, preferably an inorganic cation such as divalent metal ions such as $Pb^{2+}$, $Sn^{2+}$, $Eu^{2+}$, $Cu^{2+}$ and X is an anion; and X is an anion, preferably a halide such as $Cl^-$, $Br^-$ or $L^-$. These perovskites are able to directly convert incoming photons to electrons and handle high irradiation rates.

The material having a perovskite crystal structure may be additionally doped with a metal ion, preferably doped with a metal ion such as $Sn^{2+}$, or a rare earth material, such as $Eu^{2+}$. This gives the perovskite scintillating properties as well.

The read-out layer preferably comprises a silicon based integrated circuit, in which on-site processing may be performed, as well as providing structural stability. Alternatively the read-out layer comprises a polymer foil, preferably polyimide (PI), polyethylene naphtalate (PEN) or polyethylene terephthalate (PET). These are relatively cheap commodity materials that are often used as substrates in electronics.

Preferably, the electrical contact structure has a thickness smaller than 5 micron, preferably smaller than 1 micron, more preferably smaller than 0.1 micron. Preferably, the read-out layer has a thickness smaller than 100 microns, more preferably smaller than 50 microns, and most preferably smaller than 20 microns. The thinner these layers, the less 'dead' space is present on the detector where no detection is possible.

Preferably, the X-ray detection layer has a thickness between 0.1 and 5 millimeter, preferably between 0.1 and 0.5 millimeter. Thinner layers allow for a higher resolution of the detector. Such thin layers may be acquired by one-step low temperature thin film depositing of perovskites, which is relatively cheap, especially compared to obtaining thin single crystal direct conversion layers.

Preferably, the X-ray detector element has a rectangular shape with a length between 1 and 20 centimeter, preferably between 1 and 2 centimeter, a width between 1 and 2 centimeter and a thickness between 2 and 10 millimeter. A single detector element or several extending from each other may thus provide full detector coverage.

Further embodiments according to the present invention are directed to a X-ray detector comprising a plurality of X-ray detector elements, preferably 50-100, according to the present invention, wherein the plurality of X-ray detectors are placed vertical with respect to a detector base and parallel with respect to each other. This allows for edge-on illumination which is able to handle high irradiation rates and is relatively cheap to produce.

Further embodiments are directed towards medical imagers comprising the radiation detector according to the present invention, such as an X-ray Imaging device comprising an X-ray detector, preferably a computed tomography device, preferably a multi-energy computed tomography device or such as a nuclear medicine imaging device, such as a single-photon emission computed tomography device or a positron emission tomography device.

Further embodiments are directed towards a method to produce an X-ray detector element, including the steps of depositing a perovskite layer on a read-out layer comprising electrically conductive read-out structures; and applying an electrical contact structure on the perovskite layer on a side opposite the read-out layer.

In a further embodiment a radiation detector is constructed by placing a plurality of X-ray detector elements perpendicular with respect to a detector base and parallel with respect to each other.

Still further aspects and embodiments of the present invention will be appreciated by those of ordinary skill in the art upon reading and understanding the following detailed description. Numerous additional advantages and benefits will become apparent to those of ordinary skill in the art upon reading the following detailed description of preferred embodiments.

The invention may take form in various components and arrangements of components, and in various process operations and arrangements of process operations. The drawings are only for the purpose of illustrating preferred embodiments and are not to be construed as limiting the invention. To better visualize certain features may be omitted or dimensions may be not be according to scale.

DETAILED DESCRIPTION OF EMBODIMENTS

Figure 1:
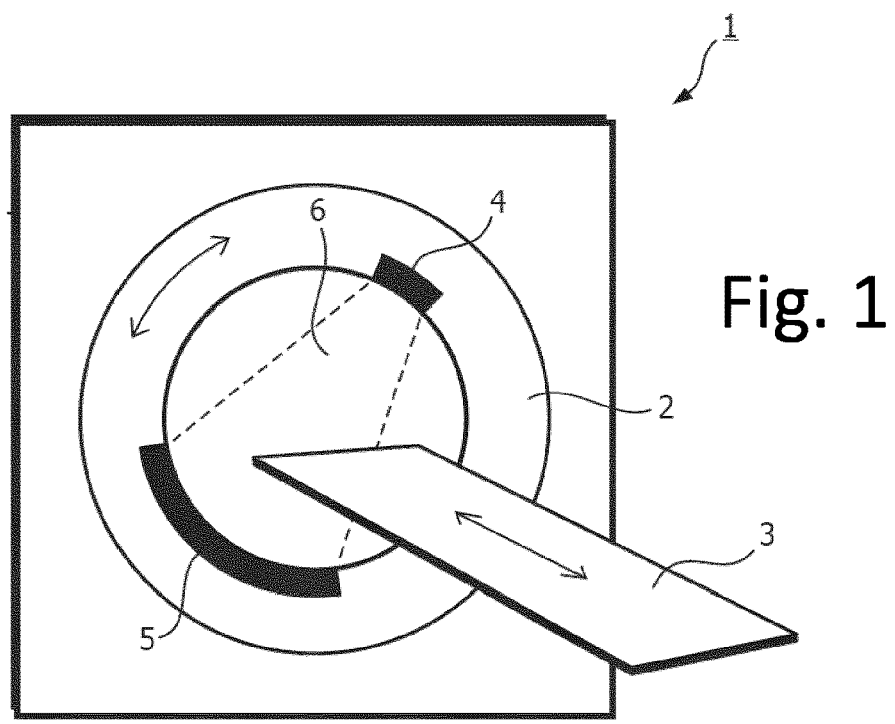
FIG. 1 shows a highly schematic depiction of a known computed tomography device.

FIG. 1 shows a highly schematic depiction of a computed tomography (CT) device 1. An X-ray detector 5, in this embodiment a direct conversion photon-counting detector, and an X-ray source 4, in this embodiment an x-ray source, are mounted on a rotatable gantry 2. A subject to be scanned, such as a patient, is positioned on a movable support 3, which during scanning moves through examination region 6, while gantry 2 rotates around the examination area and x-ray source 4 emits x-ray radiation x. The x-ray radiation x passes through the examination area 6, wherein x-ray radiation x is usually attenuated differently by different regions of the subject, and is detected by X-ray detector 5, in which the detected x-ray radiation is converted to electronic information that is further processed in further processing equipment (not shown) to visual information that is displayed to a user, such as a physician.

Figure 2:
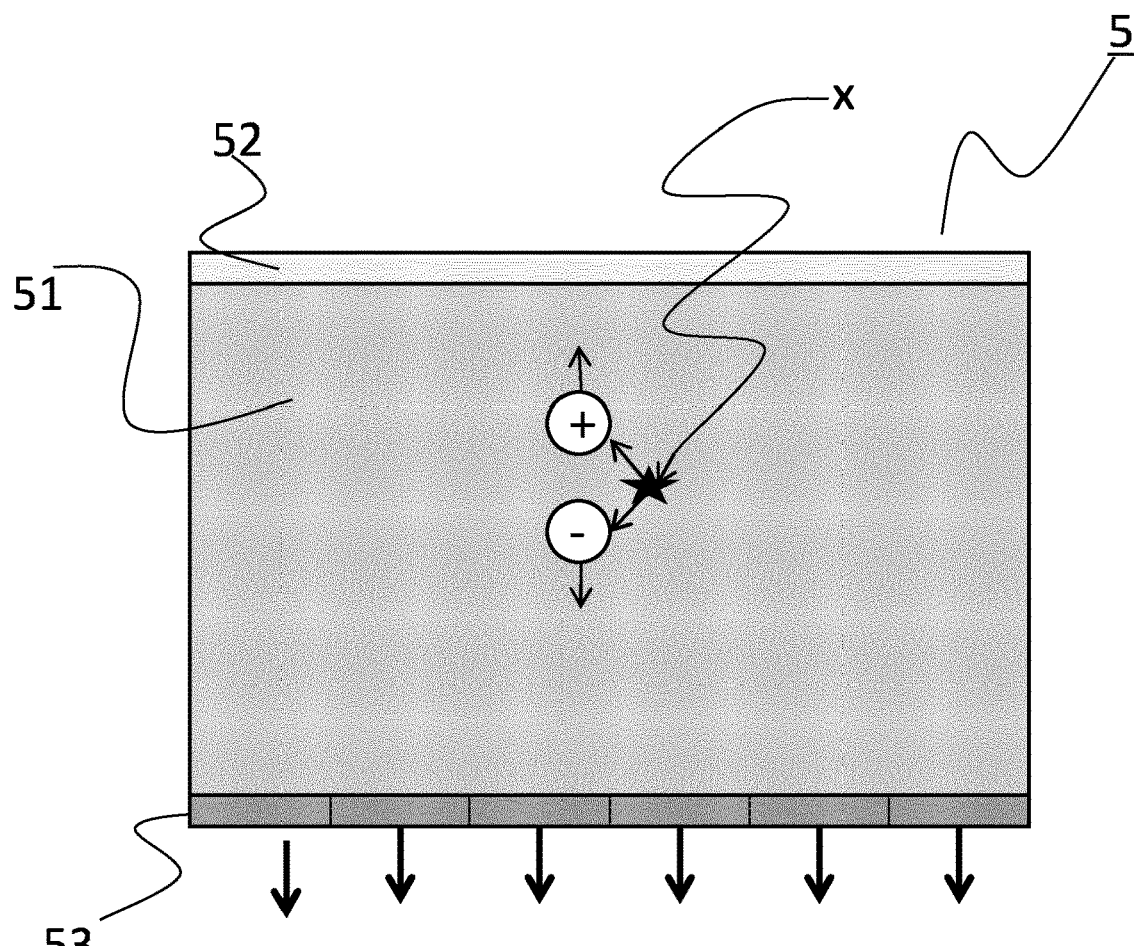
FIG. 2 shows a highly schematic depiction of a known direct conversion photon counting detector element in cross section.

FIG. 2 shows a highly schematic depiction of a direct conversion photon counting detector element 5 in cross section with which incoming X-rays are directly converted into electrons. An array or row of such elements 50 form the core parts of a direct photon conversion photon counting detector 5 (which usually also includes a substrate, a dedicated integrated circuit and other structural components.

A bulk of the direct photon conversion detector element 50 is formed by direct conversion material layer 51. The direct conversion material layer 51 is usually composed of a single-crystal semiconductor material, which is an intrinsic material or has a fully depleted p-i-n structure. State-of-the-art direct conversion materials are usually $Cd_xZn_{1-x}Te$ (Cadmium Zinc Telluride, commonly abbreviated to CZT) or Cadmium Telluride (CdTe). The direct conversion layer 51 is placed between a detector cathode 52 and detector anode 53. The detector cathode is held at a negative bias potential, while the detector anode is held at a less repelling (usually an attracting positive) potential. The detector cathode 52 normally forms a continuous layer on the direct conversion material layer 51 and is generally transparent to X-rays with an energies that are to be detected by the direct conversion photon counting detector. The detector anode 53 is on the opposite side of the direct conversion layer 51 and is made up from an array grid of detector pixels.

When an X-ray photon x passes the detector cathode 52 and penetrates into the direct conversion material layer 51, the photon interacts with direct conversion material to generate numerous electron-hole pairs. The positively charged holes drift towards the strongly negatively charged detector cathode 52, while the negatively charged electrons drift towards the more positively charged detector anode 53. When the electrons approach detector anode 53, a signal is induced from each detector pixel, which, after collection, is indicative of a count or charge of electrons that approached that particular electrode pixel. The generated signal is then further processed by processing units (not shown) and eventually displayed on a display unit (not shown) to a user as written information or as a reconstructed image of (part of) an examined body.

As mentioned previously, current direct photon conversion materials technology, using horizontal slabs of direct conversion material with pixelated top or bottom contacts, allows for typical minimum pixel size of 0.2-0.5 mm with the thickness of approximately >1.5 mm. This is not sufficient for high irradiation rates since state-of-the-art photon counting electronics cannot support the rate/channel equivalent in air. Furthermore, CZT has an intrinsic transient response in the order of tens of nanoseconds, which is insufficient. Therefore alternate solutions must be found to enable higher irradiation rates.

One solution is to illuminate the direct conversion layer 51 edge-on. In other words: the direct photon conversion detector elements 50 are placed perpendicularly ('vertically') with respect to a detector substrate 54 instead of forming a ('horizontal') layered structure on said substrate 54. This allows for sufficient pixilation and high irradiation rates, but manufacturing is complex and expensive.

It is an insight of the present invention that instead of state-of-the-art direct conversion materials, such as CZT, CdTe or GaAs, hybrid organic-inorganic materials comprising a perovskite structure (hereinafter also referred to as 'perovskites') may be used as a direct conversion material instead. Such perovskites show a very fast x-ray response, which is not the case with most alternative direct photon converting materials. For instance, amorphous selenium, lead oxide, and mercury iodide are all layered materials exhibiting an undesirable amount of trapping, making them slow in response to x-ray radiation. The only other fast materials are single crystalline materials, such as the aforementioned CdTe or CZT, Ge or GaAs. These are all are produced and cut as thick crystals from a boule, which makes them extremely expensive and causes a lot of a waste of material if thin layers are required. Basically, it is extremely difficult and expensive to structure single crystal materials in the thin layers and in a configuration required for edge-on detectors with required high control of the detector structure.

Perovskites are easier to process (in a low temperature, large area deposition process) and easier to structure than single crystalline photon converting materials, making them especially suitable for use in a vertically stacked configuration of direct conversion detector elements 50. Due to this manufacturing advantage, it is possible to control the detector structure precisely and reproducibly. Furthermore, perovskites are inherently much cheaper than CZT, CdTe or GaAs as well.

Perovskites could potentially also be used in a horizontal configuration. However, to obtain sufficient layer thickness, the perovskite needs to be applied in multiple layers, since perovskites are preferably to be applied in very thin layers. This reduces the advantage of perovskites for the horizontal configuration, but it may still be a good option in some cases. Some perovskites are also available in single crystal form and may be more suitable, although manufacturing of these in sufficient layer thickness is complicated. Vertically aligned detector elements 50 need a much thinner layer thickness and deposited perovskites are therefore extremely suitable for such embodiments.

In the context of the present invention the term perovskite is used for crystalline materials with generic chemical formula $AMX_3$, wherein A is a first cation, M is a second cation and X is an anion. Suitable perovskites are usually (layered) organic-inorganic perovskites in which the A cations are normally organic (typically $C_mH_{2m+1}R$, such as $CH_3NH_3^+$, $C_2H_5NH_3^+$, $HC(NH_2)^{2+}$), the M cations are typically divalent metal ions such as $Pb^{2+}$, $Sn^{2+}$, $Eu^{2+}$, $Cu^{2+}$ etc., while the X anions are halides ($Cl^-$, $Br^-$, $I^-$), see for instance: T. C. Sum and N. Mathews, 'Advancements in perovskite solar cells: photophysics behind the photovoltaics', Energy Environ. Sci., 2014, 7, 2518-2534; D. B. Mitzi and K. Liang, 'Preparation and Properties of $(C_4H_9NH_3)_2EuI_4$: 'A Luminescent Organic-Inorganic Perovskite with a Divalent Rare-Earth Metal Halide Framework', Chem. Mater., 1997, 9 (12), pp 2990-2995; or Z. Cheng and J. Lin, 'Layered organic-inorganic hybrid perovskites: structure, optical properties, film preparation, patterning and templating engineering', Cryst. Eng. Comm. 2010, 12, 2646-2662.

$CH_3NH_3Pb_{4-y}X_y$ (methylammonium lead halides) are particularly suitable perovskites to use as direct conversion in light of the present invention. Alternatively, $CH_3NH_3Sn_{4-y}X_y$ (methylammonium tin halides) may be advantageously used as well if a non-lead based-compound is desired.

Figures 3A, 3B:
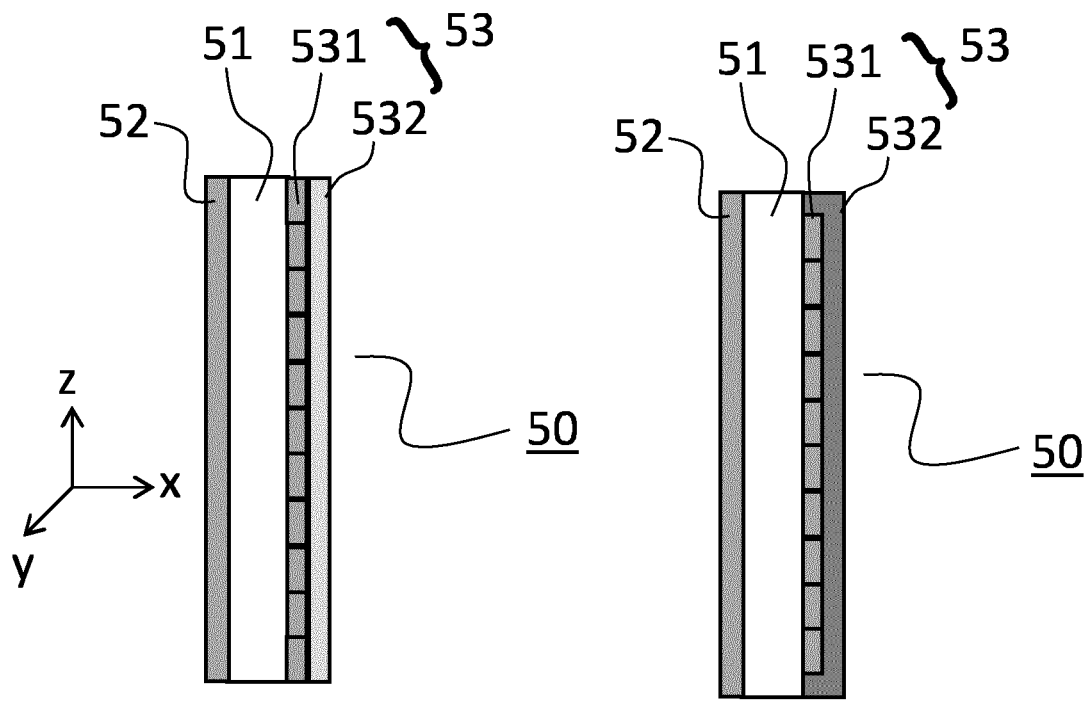
FIG. 3A-B show a highly schematic depiction of various embodiments of vertically aligned direct conversion photon counting detector elements in cross section.

FIG. 3A shows a first embodiment of vertically aligned direct photon conversion detector 5. In this embodiment several direct photon conversion detector elements 50 are placed substantially vertically with respect to a detector substrate 54. Preferred is an exact vertical alignment (exactly perpendicular to the substrate 54), but some variation, e.g. 5% either way, may be desired as well. CT detectors are curved and comprise many more elements 50 and an angle between the direct photon conversion detector element 50 and the detector substrate 56 may be adapted thereto. Also different direct photon conversion detector elements 50 may each individually have a different angle. For clarity the detector is shown in a flat configuration with a limited amount of slabs. A flat configuration would be suitable for normal X-ray imaging and the invention is also applicable for such an imaging modality.

Each direct photon conversion detector element 50 comprises a direct conversion layer 51 of a material having a perovskite structure placed between an electrical contact structure 52 on a first side of the direct conversion layer 51 and a layer comprising electrically conductive read-out structures 53 on a second side, opposite of the first side, of the direct conversion layer 51.

The perovskite direct conversion layer 51 preferably has a thickness (x direction in the figure) has a thickness between 0.1 and 5 millimeter, preferably between 0.1 and 0.5 millimeter. This thickness may be obtained in a single processing step, preferably in a low temperature, large area deposition processing step. The preferred length (y direction in the figure) of the direct conversion layer is between 1 and 20 cm. Full detector coverage would require slabs of about 20 cm, but these are more difficult to manufacture than smaller slabs. In a preferred embodiment the length of a direct conversion layer is between 1 and 2 cm and multiple, e.g. 4 to 10, direct conversion layers may be placed next to each other in the y direction to create larger coverage. The preferred height for a direct photon conversion detector element (z direction in the figure) of the direct conversion layer is between 1 and 2 cm.

On a first side the perovskite direct conversion layer 51 is in contact with an electrical contact structure 52 which is preferably applied directly on and covering the first side. In horizontally arranged direct photon conversion detector elements the equivalent electrical contact structure would be in the path between incoming X-rays and the direct conversion. Therefore it needs to be constructed of a material that is preferably transparent to the wavelength of said X-rays. For a vertically arranged direct photon conversion detector element 50 this requirement is not necessary or even desired. An advantage is that cheaper electrically conductive materials may be used. Preferably the electrical contact structure 52 is flat and completely covers the first side of the perovskite direct conversion layer 51. Preferably the thickness of the electrical contact structure 52 is as thin as possible, while still allowing good and reliable electrical contact, because this layer takes up detector surface space which is on which X-ray detection is not possible. Preferably the thickness of the electrical contact structure 52 is smaller than 5 micron, preferably smaller than 1 micron, more preferably smaller than 0.1 micron.

On a second side, opposite of the first side, the perovskite direct conversion layer 51 is in contact with a read-out layer 53 comprising electrically conductive read-out structures 531. The read-out structures 531 are preferably attached to (FIG. 3A) or embedded in (FIG. 3B) a read-out structure substrate 532. As with the electrical contact structure 52, the read-out layer 53 takes up detector surface area and is preferably as thin as possible to reduce non-detecting detector surface as much as practically possible, preferably smaller than 100 microns, more preferably smaller than 50 microns, and most preferably smaller than 20 microns.

FIG. 3A shows a direct photon conversion detector element 50 wherein the read-out layer 53 formed by a thin-film substrate 532 on which the electrical conductive read-out structure 531 is applied, e.g. by metal deposition. The thin-film substrate 532 preferably consists of or comprises a polymer foil, preferably polyimide (PI), polyethylene naphtalate (PEN) or polyethylene terephthalate (PET). These are relatively cheaply available commodity films and are suitable for applying electrode structures 531 on. The read-out structure substrate 532 may also be a layered structure, e.g. comprising an additional mechanical support and/or electrical isolating layer 55.

The read-out structures 531 may be of any suitable electrically conductive material, metallic, organic or other, known to a skilled person. The read-out structures 531 may be a single structure covering all or most of the read-out structure substrate 532, but preferably it has a pixelated row or array structure, which may be advantageously used to precisely detect the position of a X-ray-to-electron conversion event in the direct photon conversion layer 51 and obtain the advantage of increasing the rate capability with edge-on.

Alternatively, as shown in FIG. 3B, the read-out layer 53 may be a silicon-based structure, such an integrated circuit on which read-out structures 531 are electrical pathways integrated in or formed on a silicon substrate 532, for instance a CMOS-based substrate. This allows for mechanical stability and localized electrical processing.

Equivalent to the horizontal embodiment shown in FIG. 2, in a vertically arranged direct photon conversion detector element 50, the electrical contact structure 52 acts as a cathode, which is held at a negative bias potential. The electrical read-out structures 531 form a (pixelated) anode, which is held at a less repelling or an attracting positive potential. Electronic information is transferred to and processed in an integrated circuit locally or removed from the direct photon conversion detector element 50.

Figure 4:
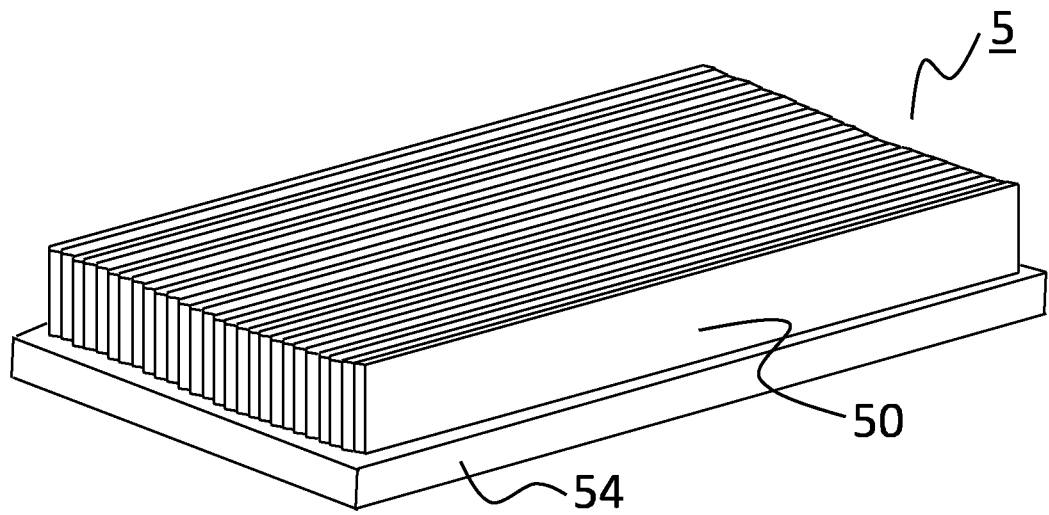
FIG. 4 shows a schematic depiction of an X-ray detector with vertically aligned detector elements in perspective view.

A multitude of direct photon conversion detector elements 50, preferably between 50 and 100, are mounted substantially parallel on a detector substrate 54, forming a direct photon conversion X-ray detector 5, as is schematically shown in perspective in FIG. 4 and in various embodiments in side view in FIGS. 5A-D. The detector substrate 54 may be only a support layer, but may also have one or more additional functionalities, such as a heat sink or an integrated circuit. Design of the detector substrate 54 and further layers as well as detector electronics throughout would be in the available competences of a skilled person.

Figure 5A:
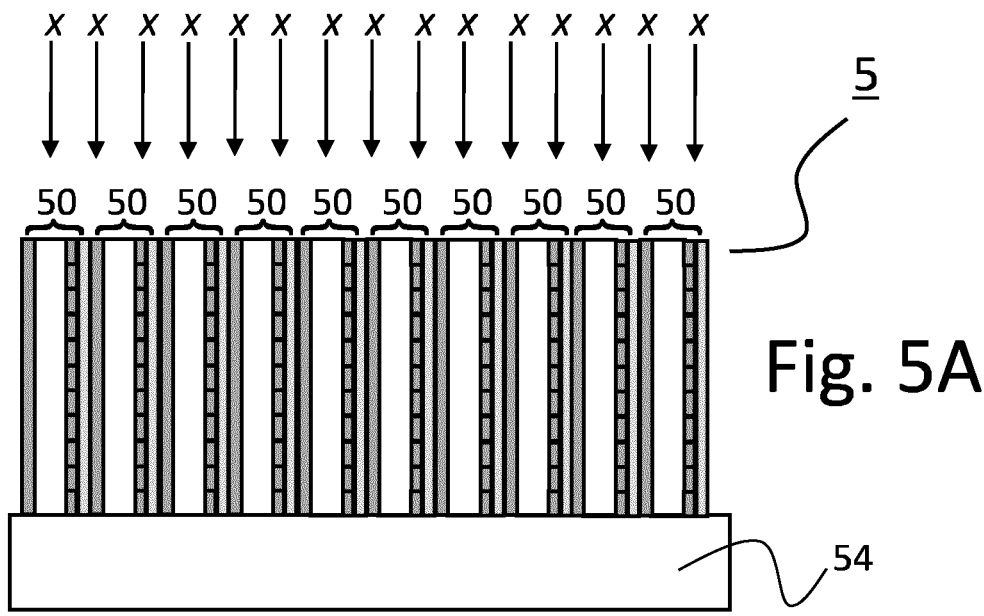
FIG. 5A-C show a highly schematic depiction of various embodiments of vertically aligned direct conversion photon counting detector elements in cross section.
Figure 5B:
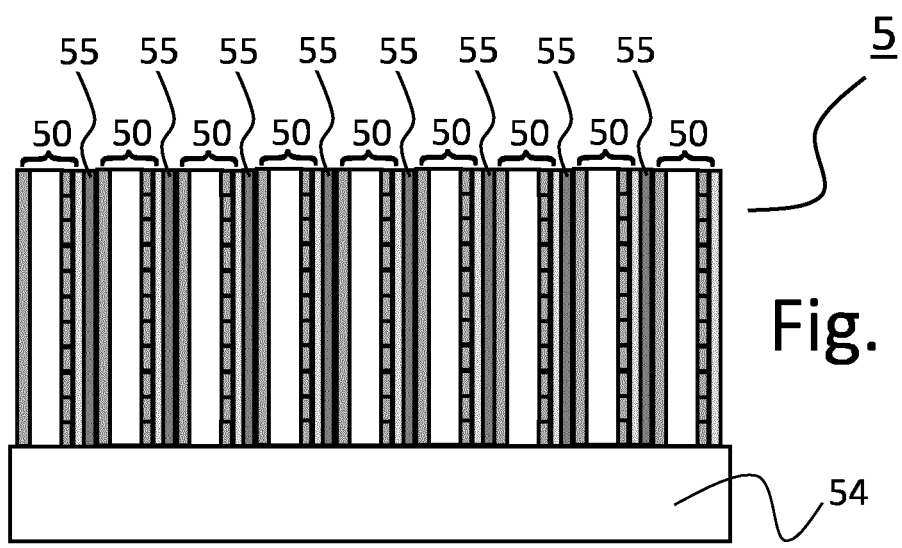

Preferably the direct photon conversion detector elements 50 are placed on the detector substrate with a gap, defining the length of an open or filled area between two adjoining direct photon conversion elements 50. The gap should be kept as small as possible, because the larger the gap, the larger the 'dead' area of the detector 5 where no X-ray detection is performed. Preferably, the gap is zero (no gap), meaning that two adjacent direct photon conversion elements 50 are placed such that they contact each other, as is shown in FIG. 5A. If, for instance to allow for electrical insulation, this is not possible then the direct photon conversion elements 50 may be separated by an insulating layer 55, as is shown in FIG. 5B. The insulating layer may be an air gap in its simplest embodiment or it may be a physical layer of an electrically isolating material, which may be integrated into the read-out structure substrate 532.

Figure 5C:
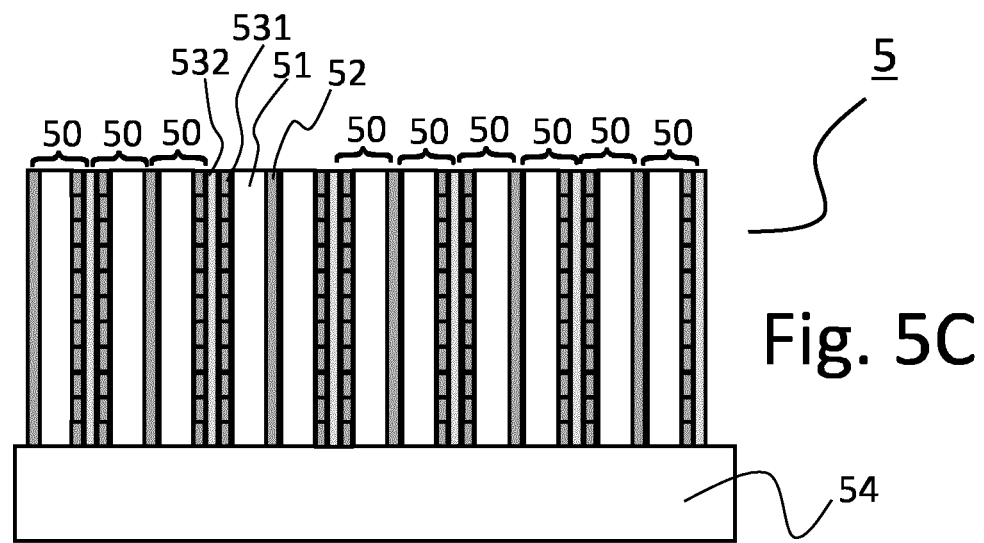

FIG. 5C shows a particularly interesting design wherein two adjoining direct photon conversion elements 50 are placed such that the first side of a direct photon conversion layer 51 faces the first side of a neighboring direct photon conversion layer 51 on one side and the second side of a direct photon conversion layer 51 faces the second side of another neighboring direct photon conversion layer 51 on the other side (obviously excluding the outer direct photon conversion elements 50). In other words: each subsequent direct photon conversion element 50 is placed such that it mirrors the next. Due to this arrangement it is possible to have two subsequent direct photon conversion elements 50 share an electrical contact layer 52 and a read-out layer 53, provided that the electrically conductive read-out structures 531 of the direct photon conversion elements 50 are separated from each other, sharing only the read-out structure substrate 532. With this arrangement less material is needed and potentially more direct photon conversion elements 50 may cover the detector substrate 54.

Even though FIGS. 5A, B and C are directed to thin-film-based read-out layers 53, these may be easily adapted for use with silicon-based read-out layers 53.

Figure 6:
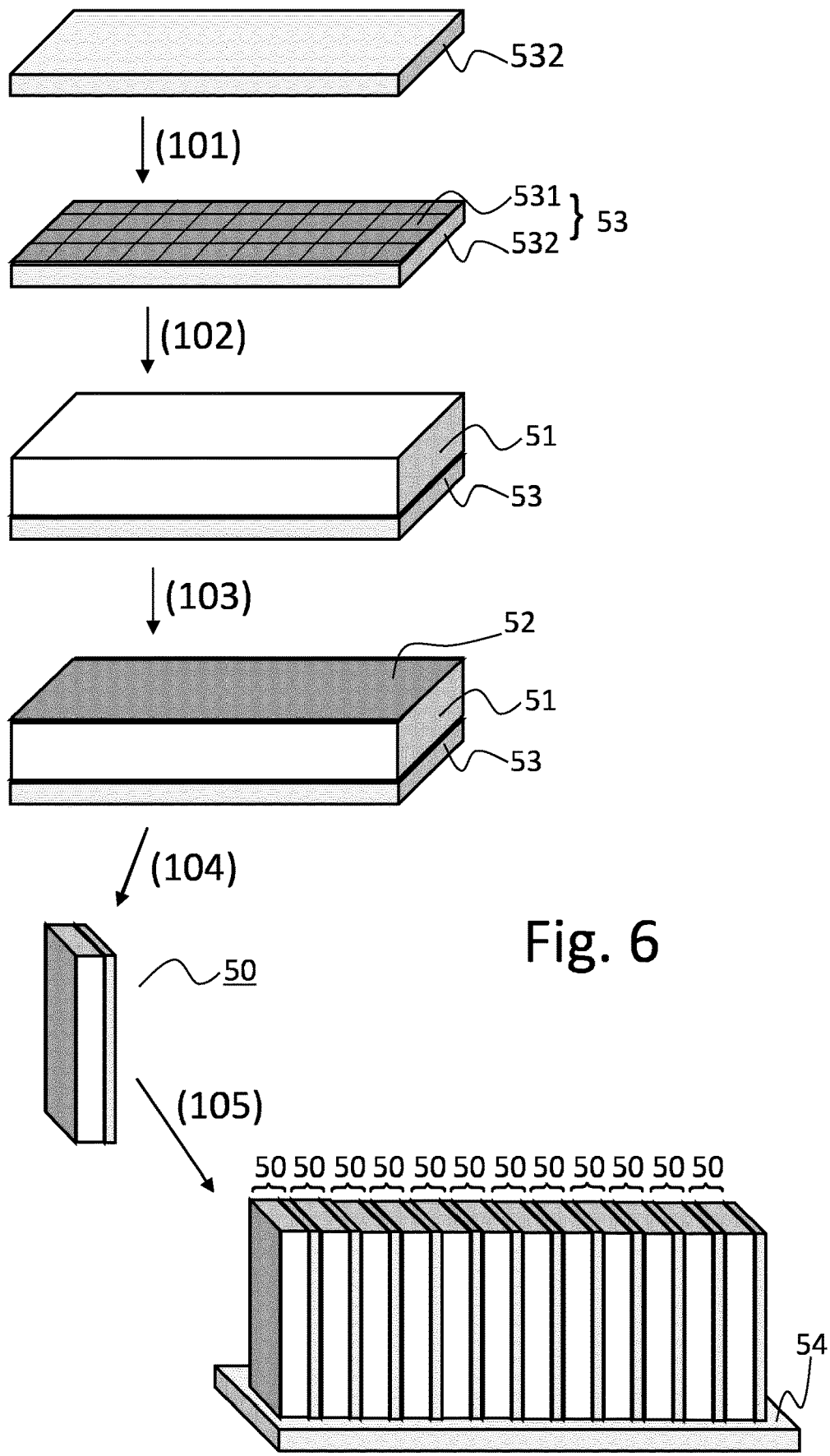
FIG. 6 shows a stylized and simplified depiction of a method to manufacture a direct conversion photon counting detector.

FIG. 6 shows a schematic depiction of a process to manufacture an X-ray detector with vertically stacked X-ray detector elements.

In this exemplary process a thin-film polymer substrate 532 is prepared in the desired dimensions, e.g. a 30 micron polyimide film of 1.5×10 cm. Electrically conductive read-out structures 531 are applied (101) to the substrate 531, e.g. by depositing metallic structures or coating the substrate with electrically conductive materials, such as silver, aluminium or gold, that may be patterned into a pixelated structure. As such a read-out layer 53 is formed.

Next, a perovskite direct conversion layer is formed (102) on the read-out layer, for instance a 0.3 mm thick $CH_3NH_3PbI_3$ (methylammonium lead iodide) layer that is deposited in a single step at a low temperature (at room temperature or a slightly elevated temperature, e.g. up to 50 degrees Celsius) on the read-out layer 53.

Then an electrical contact structure 52, e.g. a deposited metal layer or a coated conductive organic material, is applied (103) on the perovskite direct conversion layer 51 at the side opposite that of the read-out layer 53.

As such a perovskite direct photon conversion detector element 50 is formed. This process may obviously also be performed differently to arrive at a similar or the same outcome, e.g. by starting from the X-ray detection layer 541 or from the electrical contact structure 52 on the first side.

Alternatively, instead of applying (101) read-out structures 531 on a thin-film (polymer) substrate 532, a silicon based integrated circuit may also be prepared to form a read-out layer 53. The further steps are unchanged.

The formed perovskite direct photon conversion detector elements 50 is then placed (104) on a detector substrate 54 in a substantially perpendicular arrangement ('vertically') with respect to the detector substrate 54, which may be a support structure or an integrated circuit. The direct photon conversion detector element 50 may be connected to the detector substrate 54 by soldering, preferably using solder balls which are melted to form the 90° joint between the read-out later 53 and the substrate 54, gluing, welding, mechanically connecting or any suitable connection technique known to the skilled person.

A second direct photon conversion detector element 50 is placed (105) parallel to the first on the detector substrate 54 with a gap that is as small as possible, preferably the gap is zero. This is repeated with more (e.g. a hundred) direct photon conversion detector elements 50 until the desired area of the detector substrate 54 is covered. As such, a direct photon conversion X-ray detector 5 is formed that is able to handle high irradiation rates due to its edge-on illumination, but using relatively cheap and easy to process perovskites. FIG. 4 shows a simplified depiction of such an X-ray detector 5.

If an insulating layer 55 is necessary, the after the step of applying (103) the electrical contact structure 52, the insulating layer 55 may be applied on the electrical contact structure (e.g. by coating or depositing). Alternatively the insulating layer may be applied when the direct photon conversion detector elements 50 are placed (105) on the substrate 54, e.g. by inserting an insulating element 55 after each direct photon conversion detector element 50 or by leaving an air gap between two successive elements 50.

The direct photon conversion detector 5 may be applied as a multi-energy and/or photon counting detector in an X-ray imaging device, particularly a CT device. Most preferably a multi-energy or photon counting X-ray device.

In an alternative embodiment the X-ray detector 5 according to the present invention may be advantageously used in a nuclear medicine imaging device (such as a positron emission tomography (PET) device or a single-photon emission computed tomography (SPECT) device). In this embodiment the perovskite layer is not used as a direct conversion layer, but as a scintillator for indirect X-ray conversion in which a photon is converted to a photon with a different energy and then converted, in a photodiode, to an electron.

Scintillating perovskites may be obtained by intentional doping with e.g. rare earth (like $Eu^{2+}$) or other metal ions like $Sn^{2+}$. In addition, some perovskites show excitonic emission with a very short decay time (e.g. shorter than 10 ns). The build-up of the layered stacks in a perpendicular orientation is the same as in the direction conversion case, but in addition photodiodes need to be integrated.

First, organic photodiodes are produced on, preferably, a thin plastic foil with an optically transparent top contact (e.g. transparent conductive oxide or very thin metal layer, typically a few nm thick), facing the perovskite scintillation material and another electrical contact on the other side. Readout of charges is performed using conducting lines e.g. printed on the plastic foil leading to a counting integrated circuit placed outside the layer stack.

Second, organic photodiodes (OPDs) are directly applied onto counting integrated circuits that are made in thinned silicon wafers. The OPDs including contacts may be made in low temperature processes with a thickness lower than 1 micron. In this case only pre-processed signals need to be guided to outside the layer stack.

The scintillating perovskite layer is directly grown on the integrated circuit and stacked perpendicularly with respect to the integrated circuit surface.

It is expected that detector thickness for SPECT or PET detectors will increase from few millimeter to the centimeter range. This means that the thickness of the perovskite layer itself is increased from few hundred micrometers to a few millimeters. This would result in an inexpensive volume detector with depth-of-interaction measurement. Currently developed organic-inorganic perovskites like $CH_3NH_3PbI_3$ contain lead and iodine, have a density 4.62 g/cm$^3$, providing appreciable X-ray and gamma ray absorption with 2 mm absorption length for 140 keV gamma energy. This would be at least sufficient for the standard radioisotope Tc-99m for SPECT. While the process of depositing such thick perovskite layers is still in its infancy, it may be achieved by depositing multiple perovskite layers on top of each other, which would extend the processing time and increase the cost. This still might be economically more feasible than the alternatives based on current state-of-the-art technologies. Further developments in perovskite technology and deposition techniques will increase the feasibility of using perovskites even further.

The invention is illustrated using medical imaging as examples, but it may also find use in the field of astronomy, security scanning or optical cameras that use direct photon conversion.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measured cannot be used to advantage.

Any reference signs in the claims should not be construed as limiting the scope.

The invention claimed is:

1. An X-ray detector element comprising a layered structure comprising a direct conversion X-ray detection layer comprising a material having a perovskite crystal structure, wherein said X-ray detection layer is connected on a first side to an electrical contact structure and on a second side, opposite to the first side, to a read-out layer comprising an electrically conductive read-out structure.

2. The X-ray detector element according to claim 1, wherein the material having a perovskite structure is $AMX_3$, wherein A is a first cation, preferably an organic cation such as $C_mH_{2m+1}R$, wherein R may be any random group, preferably a nitrogen-based group; M is a second cation, preferably an inorganic cation such as divalent metal ions such as $Pb^{2+}$, $Sn^{2+}$, $Eu^{2+}$, $Cu^{2+}$ and X is an anion; and X is an anion, preferably a halide such as Cl$^-$, Br$^-$ or I$^-$.

3. The X-ray detector element according to claim 1, wherein the material having a perovskite crystal structure is doped with a metal ion, preferably doped with a metal ion such as $Sn^{2+}$, or a rare earth material, such as $Eu^{2+}$.

4. The X-ray detector element according to claim 1, wherein the read-out layer comprises a silicon based integrated circuit or a polymer foil, preferably polyimide (PI), polyethylene naphtalate (PEN) or polyethylene terephthalate (PET).

5. The X-ray detector element according to claim 1, wherein the electrical contact structure has a thickness smaller than 5 micron, preferably smaller than 1 micron, more preferably smaller than 0.1 micron.

6. The X-ray detector element according to claim 1, wherein the read-out layer has a thickness smaller than 100 microns, more preferably smaller than 50 microns, and most preferably smaller than 20 microns.

7. The X-ray detector element according to claim 1, wherein the X-ray detection layer has a thickness between 0.1 and 5 millimeter, preferably between 0.1 and 0.5 millimeter.

8. The X-ray detector element according to claim 1, wherein the element has a rectangular shape with a length between 1 and 20 centimeter, preferably between 1 and 2 centimeter, a width between 1 and 2 centimeter and a thickness between 2 and 10 millimeter.

9. The X-ray detector comprising a plurality of X-ray detector elements according to claim 1, wherein each of the plurality of X-ray detector elements are placed on a detector base, aligned substantially perpendicularly with respect to said detector base and parallel with respect to neighboring X-ray detector elements.

10. The X-ray detector, wherein the plurality of X-ray detector elements comprises between 50 and 100 X-ray detector elements according to claim 1.

11. The X-ray Imaging device comprising an X-ray detector claim 9, preferably a computed tomography device, preferably a multi-energy computed tomography device.

12. A nuclear medicine imaging device, such as a single-photon emission computed tomography device or a positron emission tomography device, comprising an X-ray detector claim 9, comprising an X-ray detection layer with a thickness larger than 0.5 millimeter, preferably with a thickness larger than 1 millimeter.

13. A method to produce an X-ray detector element, including the steps of:
   depositing a perovskite layer on a read-out layer comprising elect
   applying an electrical contact structure on the perovskite layer on a side opposite the read-out layer.

14. The method according to claim 13, wherein the read-out layer comprises a silicon based integrated circuit or a polymer foil, preferably polyimide (PI), polyethylene naphtalate (PEN) or polyethylene terephthalate (PET).

15. The method according to claim 13, wherein the perovskite layer is deposited between room temperature and 50 degrees Celsius, preferably at room temperature.

16. A method to produce an X-ray detector, comprising the steps of:
   placing a plurality of X-ray detector elements according to claim 1 perpendicular with respect to a detector base and parallel with respect to each other.

* * * * *